Jan. 13, 1959
C. R. WISCHMEYER
ELECTRONIC GATE CIRCUIT
Filed June 9, 1954
2,868,971
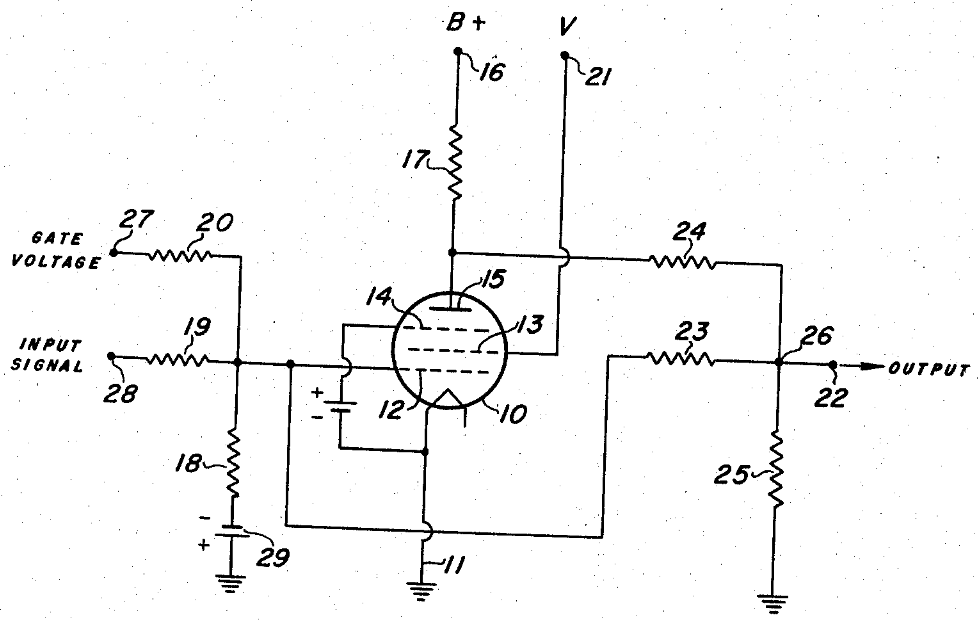
INVENTOR.
Carl R. Wischmeyer,
BY Melvin J. Fincke
ATTORNEY.

Patented Jan. 13, 1959

2,868,971

ELECTRONIC GATE CIRCUIT

Carl R. Wischmeyer, Houston, Tex., assignor, by mesne assignments, to Jersey Production Research Company, Tulsa, Okla., a corporation of Delaware Application June 9, 1954, Serial No. 435,442

3 Claims. (Cl. 250—27)

This invention relates to an electronic gating circuit and more particularly this invention relates to a simple and effective circuit for accepting a gating voltage and a signal voltage at the input and obtaining at the output an amplified signal during the time interval allowed by the gating voltage but otherwise unaffected by the gating voltage.

This application is a continuation-in-part of my prior copending application Serial No. 410,093, filed February 15, 1954, now Patent No. 2,831,971, granted on April 22, 1958.

For performing certain types of operations which involve electronic circuits, it is often desirable to have a means for cutting off the flow of an input signal during a certain time interval and for allowing the signal to be indicated as an output signal during certain other time intervals. In practice, this is often accomplished by the provision of an electronic tube having a control grid through which an input signal is introduced into the circuit. The electronic tube also contains another grid such as a suppressor grid which, when a negative voltage is applied thereto, operates to prevent the flow of electrons from the cathode of said electronic tube to the anode thereof thereby discontinuing the flow of current to the output. Such a circuit is called an electronic gating circuit. However, a difficulty experienced in utilizing such electronic gating systems is that the gating voltage applied in order to stop the flow of electrons to the anode of the vacuum tube produces an amplified voltage in the output of opposed phase or opposite polarity to that of the gating voltage. The undesired amplified switching voltage appears in the output along with the desired amplified input signal. Electronic circuits have been devised for the purposes of limiting or canceling out the gating voltage. However, previous circuits have required the use of a plurality of electronic tubes so arranged that the plate current of a second electron tube opposes during a certain interval of time the plate current of the electron tube receiving the input signal. The electronic circuits are complicated in structure.

It is an object, therefore, of this invention to provide a very simple electronic gating circuit capable of limiting or canceling out the gating voltage.

It is a further object of this invention to provide an electronic gating circuit which requires the use of only one electronic tube within the gating circuit itself.

Briefly described, my new electronic gating circuit consists of an electron tube having a control grid which receives both the input signal and the gating voltage. Directly connected to the control grid and also directly connected to the anode of the electronic tube, I provide a means for combining the control grid voltage and the phase-opposed voltage produced at the anode as a result of the application of said gating voltage in such a manner as to cancel out the effect of the gating voltage. The means for canceling out the gating voltage may consist of an impedance connected to the control grid with said impedance being connected to a second impedance, said second impedance being directly connected to the anode of the electron tube. The magnitudes of the two impedances are chosen so that the drops in potential across these two impedances which are in opposed phase cancel one another.

Objects other than those set out above and features of this invention will become apparent from the following detailed description when taken together with the accompanying drawing.

In the drawing, the sole figure is a schematic circuit of an embodiment of my invention.

Referring more particularly to the drawing, the embodiment shown consists of a gated-beam tube 10 consisting of a cathode 11 which is grounded, a first or control grid 12, a second or accelerator grid 13, a third grid 14, and an anode or plate 15. The plate or anode 15 of the gated-beam tube is supplied with a voltage by means of a positive voltage source (B+) which is connected at terminal 16 and conducts current through resistor 17 to the plate 15. A negative bias such as a battery 29, as shown in the drawing, supplies negative voltage to the control grid 12 through resistor 18.

The signal to be gated and the gating voltage are combined by means of the adding circuit consisting of resistances 18, 19, and 20 and impressed on the control grid 12. Grid 14 is biased so that for any control-grid voltage more positive than a predetermined value no increase in plate current occurs.

The bias of control grid 12 is such that when the gating voltage is zero, the control grid voltage is in the middle of the range in which linear variation of plate current results. In this range, the gate being "open," the voltage gain from control-grid 12 to plate 15 is appreciable; but for voltages more positive than a predetermined value, depending on the positive bias of grid 14, the gate being "closed," the gain approaches zero. For example, with a control-grid negative voltage bias of 0.5 v. and a positive bias of 2 v. on grid 14, when the gating voltage is around +15 volts, the gain from control grid 12 to plate 15 is thereby made very small resulting in the gate "closed" condition.

In a great many operations involving gating circuits, it is highly desirable that the gating voltage does not appear in any form in the output. It is toward the elimination or canceling out of the gating voltage that the remaining part of my electronic gating circuit is directed. Directly connected to the control grid 12 is a resistance 23. One end of the resistance 23 is positioned so as to receive the same applied voltages from terminals 27 and 28 as are applied to the control grid 12. Resistance 23 is connected at its other end to a second resistance 24. Resistance 24 is connected to the plate 15. A third resistance 25 represents a load across which output appears.

The output of terminal 22 has an open circuit load thereon so that no current flows in the output. Hence, according to Kirchhoff's laws, $$(E_{15}-E_{22})G_{24}+(E_{12}-E_{22})G_{23}=E_{22}G_{25}$$

or $$E_{22}=E_{15}\left(\frac{G_{24}}{G_{24}+G_{23}+G_{25}}\right)+E_{12}\left(\frac{G_{23}}{G_{24}+G_{23}+G_{25}}\right) \quad (1)$$

where:

$E_{22}$=output voltage at terminal 22.
$E_{15}$=voltage at plate 15.
$E_{12}$=voltage at control grid 12.
$G_{23}$=admittance of resistance 23.
$G_{24}$=admittance of resistance 24.
$G_{25}$=admittance of resistance 25.

From the Equation 1 it is apparent that because the plate voltage is in opposed phase or opposite polarity to the gating voltage, the values of resistances 24 and 23 can be chosen so as to cancel out the gating voltage.

When the gate is "open," the voltage gain from control grid to plate is such that the reduction in signal output due to the signal fed through resistance 23 will be tolerable. In the gate "closed" condition the input signal component at grid 12 which is fed to the output terminal 22 through resistance 23 opposes the small variations produced in voltage at the plate in the saturated condition resulting in substantially zero output.

It can be seen that my new invention provides a simple electronic gating circuit, involving only one electron tube, which cancels out the undesirable gating voltage. The circuit shown, of course, illustrates only one specific embodiment of this invention; the many possible modifications will be readily apparent to those skilled in the art.

I claim:

1. In an electronic gating circuit: a single electron tube having a cathode, a control grid, an accelerator grid, a third grid and an anode; means for applying a positive voltage bias to said third grid; means for applying a negative voltage bias to said control grid; means for applying an input signal to said control grid; means for applying a positive gating voltage to said control grid, the application of said input and positive gating voltages producing a phase-opposed voltage at said anode, a first resistance connected to said control grid through which said input and gating voltages are conducted, a second resistance connected to said anode through which said phase-opposed voltage is conducted, said first resistance and said second resistance being joined together at the output of said electronic gating circuit, the value of said first resistance and the value of said second resistance being so chosen that the applied gating voltage and the phase-opposed voltage produced by said applied gating voltage cancel one another.

2. In an electronic gating circuit: a single electron tube having a cathode, a control grid, a second grid and an anode; means for applying a positive voltage bias to said second grid; means for applying a negative voltage bias to said control grid; means for applying an input signal to said control grid; means for applying a positive gating voltage to said control grid, the application of said input and positive gating voltages producing a phase-opposed voltage at said anode, a first impedance connected to said control grid through which said input and gating voltages are conducted, a second impedance connected to said anode through which said phase-opposed voltage is conducted, said first impedance and said second impedance being joined together at the output of said electronic gating circuit, the value of said first impedance and the value of said second impedance being so chosen that the applied gating voltage and the phase-opposed voltage produced by said applied gating voltage cancel one another.

3. In an electronic gating circuit: an electron tube having at least a cathode electrode, a plate electrode, and a control grid; means for applying a negative bias voltage to said control grid; means for coupling an input signal to said control grid; means for applying a positive gating voltage to said control grid, the application of said input and positive gating voltages being adapted to produce a phase-opposed voltage at said plate electrode; first resistance means connected to said control grid through which said input and gating voltages are conducted, second resistance connected to said plate electrode through which said phase-opposed voltage is conducted, said first resistance means and second resistance means being joined together at the output of said electronic gating circuit, the value of said first resistance means and the value of said second resistance means being so chosen that the applied gating voltage and phase-opposed voltage produced by said applied gating voltage cancel one another.

References Cited in the file of this patent

UNITED STATES PATENTS

| | | |
|---|---|---|
| 2,401,779 | Swartzel | June 11, 1946 |
| 2,531,201 | De Lange | Nov. 21, 1950 |
| 2,583,146 | Jacob | Jan. 22, 1952 |

FOREIGN PATENTS

| | | |
|---|---|---|
| 567,011 | Great Britain | Jan. 24, 1945 |